May 30, 1933. G. H. HUFFERD 1,912,205
STAMPED METAL SELF ADJUSTING BEARING
Filed April 11, 1927
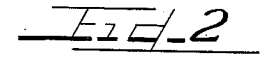
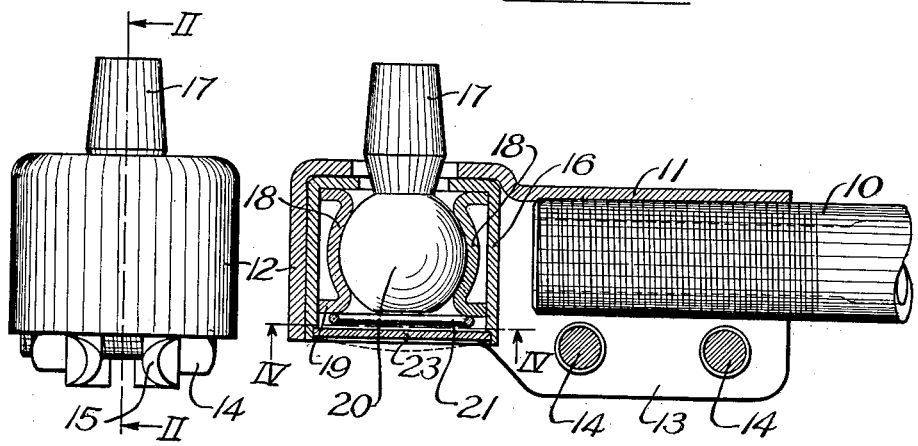
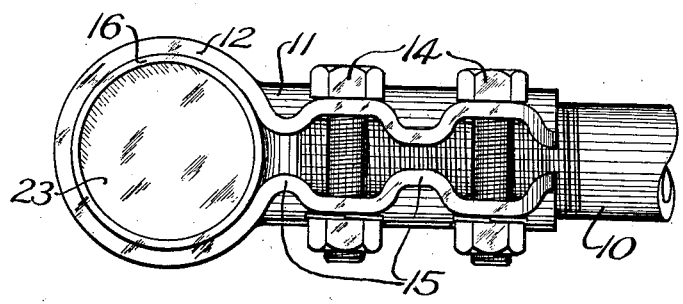
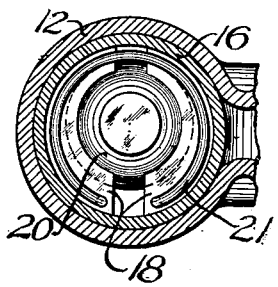
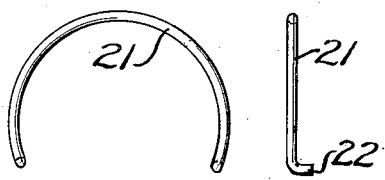
Inventor
George H. Hufferd
by Charles W. Hills
Attys.

Patented May 30, 1933

1,912,205

UNITED STATES PATENT OFFICE

GEORGE H. HUFFERD, OF DETROIT, MICHIGAN, ASSIGNOR TO THOMPSON PRODUCTS INC., A CORPORATION OF OHIO

STAMPED METAL SELF-ADJUSTING BEARING

Application filed April 11, 1927. Serial No 182,714.

This invention relates to ball joints for the ends of tie rods and drag links used in the steering linkage of vehicles.

The general object of the invention is to provide a ball joint which is simple, safe and durable, easily assembled and cheaply manufactured.

It is also an object of this invention to provide a form of ball joint wherein all the parts with the exception of the ball itself are formed by sheet metal drawing or stamping methods whereby the joint will be light in weight and machining operations will be eliminated.

It is another object of this invention to provide a ball joint including a cage containing a permanently assembled universally mounted ball with means providing automatic bearing adjustment for wear together with a clamping member for adjustably attaching said cage to the end of the tie rod or drag link.

Other and further important objects of this invention will be apparent from the disclosures in the specification and the accompanying drawing.

This invention (in a preferred form) is illustrated in the drawing and hereinafter more fully described.

On the drawing:

Figure 1 is an end elevation of a ball joint embodying the features of this invention.

Figure 2 is a section on the line II—II of Figure 1.

Figure 3 is a bottom view thereof.

Figure 4 is a section on the line IV—IV of Figure 2.

Figure 5 shows two views of the automatic take-up spring.

As shown on the drawing:

The threaded end of a tie rod or drag link is indicated by the numeral 10, this threaded end being engaged by a sheet metal stamping 11 formed with a cylindrical or cup-like socket 12 to receive the ball connection proper. This stamping 11 is formed as an internally threaded sleeve having parallel flanges 13 defining a longitudinal opening, the flanges 13 being drawn together by bolts 14 to clamp the stamping firmly on the tie rod. The flanges are preferably humped as shown at 15 between the bolts in order that the tightening of the bolts will have a distorting effect on the flanges that will pinch both the ball connection proper and the threads on the tie rod.

The ball connection proper is made as a permanently assembled separate unit including a spherical ball 20 with an integral stem 17, this unit comprising an inverted cup-like shell member 16 apertured through the bottom of the cup to receive the ball stem 17. The sides of the member 16 form a cylindrical shell in which are inserted a pair of stamped metal ball seats 18, the outer surfaces of which are formed by flanges 19 having a cylindrical outline matching the interior of the cylindrical shell while the ball seat portions are formed as segmental spherical surfaces matching a spherical ball 20, these spherical surfaces being eccentrically arranged with respect to the outer cylindrical surface so that a section of the ball seat member is wedge-like in form.

The two wedge-like ball seats are inserted in the shell with the thick ends of the wedges in opposed relationship. A curved spring 21 having hook ends 22 engaging suitable apertures in the seat flanges acts to pull the wedges apart at the thick ends, thus taking up any wear in the joint. The spherical ball and its stem is inserted in the shell along with the ball seats and the whole assembly sealed up permanently by springing into place an initially convex cover 23. This assembly is then inserted in the socket 12 in the clamping member and then the ball stem is attached to the cooperating member of the steering linkage in the usual way.

It will thus be seen that I have produced an improved form of ball joint embodying an assembly of stamped or drawn sheet metal parts that will be simple and inexpensive to manufacture and safe and durable in service.

I am aware that many changes may be made and numerous details of construction may be varied through a wide range without departing from the principles of this invention, and I therefore do not purpose limiting the patent granted hereon, otherwise than necessitated by the prior art.

I claim as my invention:

In a joint of the type described, a pair of stamped sheet metal ball seat members having upper and lower wedge shaped flanges extending outwardly therefrom.

In testimony whereof I have hereunto subscribed my name at Detroit, Wayne County, Michigan.

GEORGE H. HUFFERD.